(12) United States Patent
Chandra

(10) Patent No.: US 10,447,983 B2
(45) Date of Patent: Oct. 15, 2019

(54) RECIPROCAL APPROXIMATION CIRCUIT

(71) Applicant: NXP USA, INC., Austin, TX (US)

(72) Inventor: Mahesh Chandra, Ghaziabad (IN)

(73) Assignee: NXP USA, INC., Austin, TX (US)

(*) Notice: Subject to any disclaimer, the term of this patent is extended or adjusted under 35 U.S.C. 154(b) by 223 days.

(21) Appl. No.: 15/813,166

(22) Filed: Nov. 15, 2017

(65) Prior Publication Data

US 2019/0149789 A1    May 16, 2019

(51) Int. Cl.
| | |
|---|---|
| *G06T 1/20* | (2006.01) |
| *H04N 9/64* | (2006.01) |
| *G06F 5/01* | (2006.01) |
| *G06F 7/523* | (2006.01) |
| *G06F 7/535* | (2006.01) |
| *G06F 7/50* | (2006.01) |

(52) U.S. Cl.
CPC .............. *H04N 9/64* (2013.01); *G06F 5/01* (2013.01); *G06F 7/50* (2013.01); *G06F 7/523* (2013.01); *G06F 7/535* (2013.01); *G06T 1/20* (2013.01); *G06T 2200/28* (2013.01)

(58) Field of Classification Search
CPC .... H04N 9/64; G06F 5/01; G06F 7/50; G06F 7/523; G06F 7/535; G06T 1/20; G06T 2200/28
See application file for complete search history.

(56) References Cited

U.S. PATENT DOCUMENTS

| | | | | |
|---|---|---|---|---|
| 5,042,001 | A * | 8/1991 | Brightman | G06F 7/544 708/490 |
| 5,159,566 | A * | 10/1992 | Briggs | G06F 7/5525 708/605 |
| 5,220,524 | A * | 6/1993 | Hesson | G06F 7/535 708/502 |
| 5,261,113 | A * | 11/1993 | Jouppi | G06F 9/30036 712/222 |
| 5,278,782 | A * | 1/1994 | Nakano | G06F 7/5525 708/500 |
| 5,307,302 | A * | 4/1994 | Nakano | G06F 7/5525 708/605 |
| 6,115,733 | A * | 9/2000 | Oberman | H03M 7/24 708/605 |
| 6,134,574 | A * | 10/2000 | Oberman | G06F 7/53 708/497 |
| 6,223,198 | B1 * | 4/2001 | Oberman | G06F 7/53 708/620 |
| 7,242,414 | B1 * | 7/2007 | Thekkath | G06F 9/30014 345/623 |

(Continued)

OTHER PUBLICATIONS

E. Weisstein, "Newton's Method", Wolfram MathWorld, anon.

(Continued)

*Primary Examiner* — Sean T Motsinger

(57) ABSTRACT

A reciprocal approximation circuit has a first iteration circuit for generating an approximate reciprocal value of an operand. The operation of the first iteration circuit is controlled by two bits of the operand, which indicate a range in which the operand lies. The first iteration circuit uses hardware friendly initial values based on the two bits for generating the approximate reciprocal value. The reciprocal approximation circuit does not require any additional circuit for selecting an initial value for the first iteration circuit.

20 Claims, 6 Drawing Sheets

(56) References Cited

U.S. PATENT DOCUMENTS

| | | | | |
|---|---|---|---|---|
| 2004/0186873 A1* | 9/2004 | Tang | ............... | G06F 7/535 |
| | | | | 708/650 |
| 2006/0179092 A1* | 8/2006 | Schmookler | ............ | G06F 7/535 |
| | | | | 708/204 |
| 2007/0083586 A1* | 4/2007 | Luo | ............... | G06F 7/535 |
| | | | | 708/502 |
| 2010/0281087 A1* | 11/2010 | Powell | ............... | G06F 7/5375 |
| | | | | 708/209 |
| 2012/0079250 A1* | 3/2012 | Pineiro | ............... | G06F 9/3001 |
| | | | | 712/221 |
| 2012/0166509 A1* | 6/2012 | Sperber | ............... | G06F 7/535 |
| | | | | 708/502 |
| 2015/0363169 A1* | 12/2015 | Alvarez-Heredia | ............... | |
| | | | | G06F 7/5443 |
| | | | | 708/209 |
| 2016/0092237 A1* | 3/2016 | Veith | ............... | G06F 9/3873 |
| | | | | 712/22 |
| 2016/0110163 A1* | 4/2016 | Rarick | ............... | G06F 7/537 |
| | | | | 708/503 |
| 2016/0179515 A1* | 6/2016 | San Adrian | ......... | G06F 9/30014 |
| | | | | 712/221 |
| 2017/0308356 A1* | 10/2017 | Ebergen | ............... | G06F 5/01 |
| 2019/0149789 A1* | 5/2019 | Chandra | ............... | H04N 9/64 |
| | | | | 382/162 |
| 2019/0196789 A1* | 6/2019 | Anderson | ............. | G06F 7/5525 |

OTHER PUBLICATIONS

P. Kornerup et al., "Choosing Starting Values for Newton-Raphson Computation of Reciprocals, Square-Roots and Square-Root Reciprocals", RR-4687, INRIA, 2003.

D. L. Fowler et al., "An Accurate, High Speed Implementation of Division by Reciprocal Approximation", IEEE Proceedings of 9th Symposium on Computer Arithmetic, pp. 60-67, Santa Monica, CA, USA, 1989.

W. Liu et al., "Power Dissipation in Division", 42nd Asilomar Conference on Signals, IEEE Systems and Computers, pp. 1790-1794, Pacific Grove, CA, USA, 2008.

U. Kucukkabak et al., "Design and implementation of reciprocal unit using table look-up and Newton-Raphson iteration", Euromicro Symposium on Digital System Design (DSD), pp. 249-253, IEEE, Rennes, France, 2004.

Habegger et al., "An efficient hardware implementation for a reciprocal unit", Fifth IEEE International Symposium on Electronic Design, Test and Application (DELTA'10), pp. 183-187, IEEE, Ho Chi Minh City, Vietnam, 2010.

* cited by examiner

RECIPROCAL APPROXIMATION CIRCUIT

BACKGROUND

The present invention relates generally to image processing, and more particularly, to a reciprocal approximation circuit for image processing.

Computing applications including image processing and computer vision applications involve execution of various arithmetic operations, such as addition, multiplication, division, and normalization. These applications often require multiple arithmetic operations to be performed in succession on pixel values of various real-time digital images, such as live video feeds received from image acquisition devices. Typically, these operations are performed directly by hardware accelerators, with addition and multiplication operations being performed by adders and multipliers, and division and normalization operations performed by determining reciprocal values.

The pixel values of digital images often are represented as fixed width real numbers. The accuracy of the reciprocal values needs to match the fixed width. Various iterative methods, such as Newton-Raphson, typically are used to determine the reciprocal values. Mathematically, the Newton-Raphson method includes performing iterative approximations for determining the roots of equation (1), $$f(x)=0 \qquad (1)$$

where, f(x) is a real-valued function.

The roots of equation (1) are determined by successively approximating a solution based on equation (2), $$x_{i+1} = x_i - \frac{f(x_i)}{f'(x_i)} \qquad (2)$$

where, $x_i$ is the solution obtained from a previous iteration;
$x_{i+1}$ is the solution obtained from a current iteration;
$f(x_i)$ is the value of the function f(x), when $x=x_i$;
f'(x) is the derivative of the function f(x); and
$f'(x_i)$ is the value of the derivative of the function f(x), when $x=x_i$.

Accuracy of the solution is improved with every iteration. Therefore, the more iterations, the more accurate the solution.

Using the Newton-Raphson method, an approximate reciprocal value of an operand 'A' can be determined using equation (3):

$$x_{i+1}=x_i\times(2-Ax_i) \qquad (3)$$

where,

A is the operand for which the approximate reciprocal value is to be determined;
x is the reciprocal of the operand 'A';
$x_i$ is an approximate reciprocal value obtained from a previous iteration; and
$x_{i+1}$ is an approximate reciprocal value obtained from a current iteration.

The Newton-Raphson method includes selecting an initial value '$x_0$' for the first iteration. The accuracy of the method is based on the selection of the initial value '$x_0$'. For example, a first selection of the initial value '$x_0$' may require only two iterations for attaining 11-bit accuracy for the approximate reciprocal value, whereas a second selection may require four iterations to attain 11-bit accuracy. Hence, the selection of the initial value '$x_0$' is a critical parameter that affects the accuracy and convergence of the Newton-Raphson method, which in turn may affect the number of iterations required for attaining a desired accuracy. Conventionally, the initial value '$x_0$' is selected using a look-up operation.

FIG. 1 shows a conventional reciprocal approximation circuit 100 for determining an approximate reciprocal value of an operand 'A'. The reciprocal approximation circuit 100 includes an initial value selection circuit 102 and an iteration circuit 104. The reciprocal approximation circuit 100 receives the operand 'A' from an external circuit (not shown). The initial value selection circuit 102 provides an initial value X_0 for determining the approximate reciprocal value of the operand 'A'. The initial value selection circuit 102 includes a range selection circuit 106, a memory 108, and a multiplexer 110 (also referred to as a 'mux').

The range selection circuit 106 receives the operand 'A', and generates first and second select bits (collectively referred to as "select bits") depending on the value of 'A'. When 'A' is within a first range, the range selection circuit 106 generates the select bits '00'. When 'A' is within a second range, the range selection circuit 106 generates the select bits '01'. When 'A' is within a third range, the select bits are '10', and when 'A' is within a fourth range, the select bits '11'.

The memory 108 stores four preset, initial values for determining the approximate reciprocal value of 'A', which are associated with the four ranges used by the range selection circuit 106. The select bits generated by the range selection circuit 106 are input to the mux 110 to select one of the four initial values stored in the memory 108. The mux 110 outputs the selected one of the four initial values as the initial value X_0.

The iteration circuit 104 receives the operand 'A', and the initial value X_0, and executes the first iteration of the Newton-Raphson method for generating a first approximate reciprocal value of 'A'. The iteration circuit 104 includes a first multiplier 112, a complement circuit 114, and a second multiplier 116.

The first multiplier 112 receives 'A' and X_0, and generates a first multiplication output Y_1. The complement circuit 114 receives Y_1 and generates a complement thereof as output Y_2 (e.g., Y_2 is a 1's or 2's complement of Y_1). The second multiplier 116 receives Y_2 and multiplies it with the initial value X_0 to generate a product X_1, which represents the first approximate reciprocal value of the operand 'A'. To improve the accuracy of X_1, the iteration circuit 104 can be cascaded with other iteration circuits.

The initial value selection circuit 102 and the iteration circuit 104, including the two multipliers 112 and 116, and the ones complement circuit 114 make the reciprocal approximation circuit 100 very bulky. Therefore, when implemented on an integrated circuit, the reciprocal approximation circuit 100 consumes a large area, which is undesirable. Thus, it would be advantageous to have a reciprocal approximation circuit that consumes less area.

BRIEF DESCRIPTION OF THE DRAWINGS

The following detailed description of the preferred embodiments of the present invention will be better understood when read in conjunction with the appended drawings. The present invention is illustrated by way of example, and not limited by the accompanying figures, in which like references indicate similar elements.

DETAILED DESCRIPTION

Figure 1:
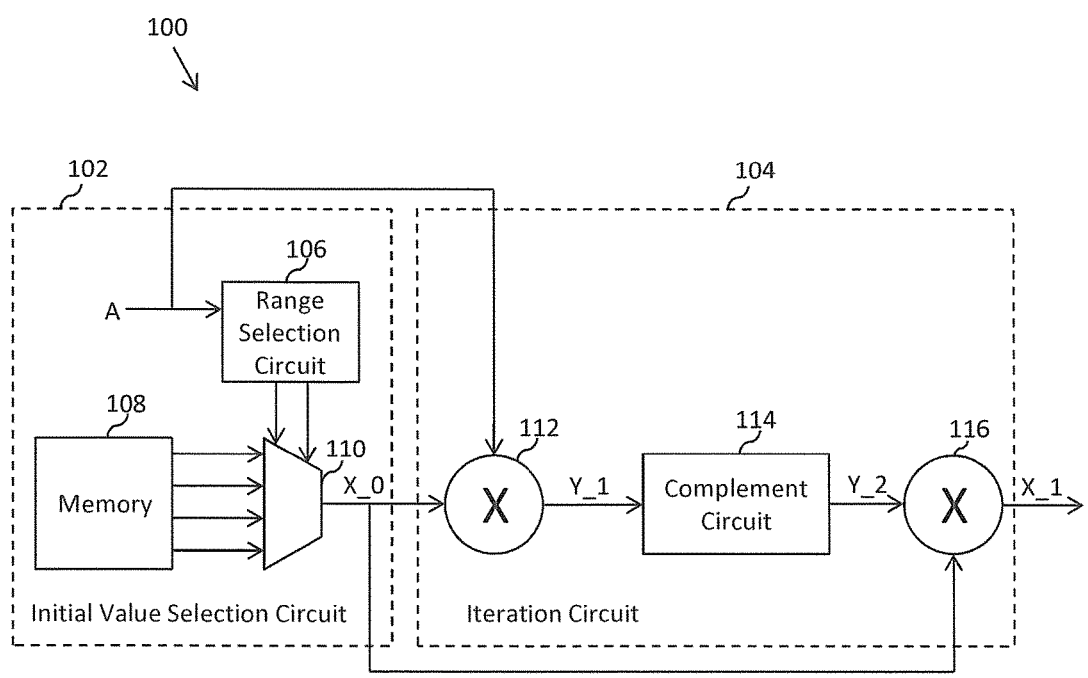
FIG. 1 is a schematic block diagram of a conventional reciprocal approximation circuit.

The detailed description of the appended drawings is intended as a description of the currently preferred embodiments of the present invention, and is not intended to represent the only form in which the present invention may be practiced. It is to be understood that the same or equivalent functions may be accomplished by different embodiments that are intended to be encompassed within the spirit and scope of the present invention.

In one embodiment, the present invention comprises a reciprocal approximation circuit for determining an approximate reciprocal value of an operand. The reciprocal approximation circuit includes a first bit-shifting circuit, a selection circuit, an adder, and a subtractor. The first bit-shifting circuit receives the operand, and generates first through fourth operand multiples. The selection circuit receives the first through fourth operand multiples, the operand and a first static bit, and outputs first through third selection outputs by selecting at least one of the operand, the first through fourth operand multiples, and the first static bit, based on first and second select bits. The adder receives the first through third selection outputs, and generates a first sum. The subtractor receives the first sum and calculates a difference between the first sum and a set of intermediate bits. The difference represents a first approximate reciprocal value of the operand.

In another embodiment, the present invention provides a method for determining an approximate reciprocal value of an operand. The method includes shifting the operand to generate first through fourth operand multiples, and then selecting at least one of the operand, the first through fourth operand multiples, and a first static bit, based on first and second select bits, and outputting first through third selection outputs. The method further includes adding the first through third selection outputs to generate a first sum, and then subtracting the first sum from a set of intermediate bits to generate a difference, which represents a first approximate reciprocal value of the operand.

Various embodiments of the present invention provide a reciprocal approximation circuit for determining an approximate reciprocal value of an operand. The reciprocal approximation circuit includes a first iteration circuit for performing a first iteration of the Newton-Raphson method. The first iteration circuit receives the operand and generates first through fourth operand multiples. Based on second and third most significant bits of the operand, the first iteration circuit selects at least one of the first through fourth operand multiples, the operand, and a first static bit, and outputs the selected signals as first through third selection outputs. The first iteration circuit adds the first through third selection outputs to generate a first sum, and then subtracts the first sum from a set of intermediate bits to generate the approximate reciprocal value of the operand. The approximate reciprocal value may be provided to a second iteration circuit for generating a second approximate reciprocal value of the operand, which is more accurate than the first approximate reciprocal value.

The first iteration circuit does not require two multipliers and a complement circuit, like the prior art circuit shown in FIG. 1. The first iteration circuit further eliminates the need of an additional initial value selection circuit for selecting an initial value for the first iteration, while maintaining high accuracy. Thus, the circuit of the present invention consumes less chip area than the conventional reciprocal approximation circuit shown in FIG. 1.

Figure 2:
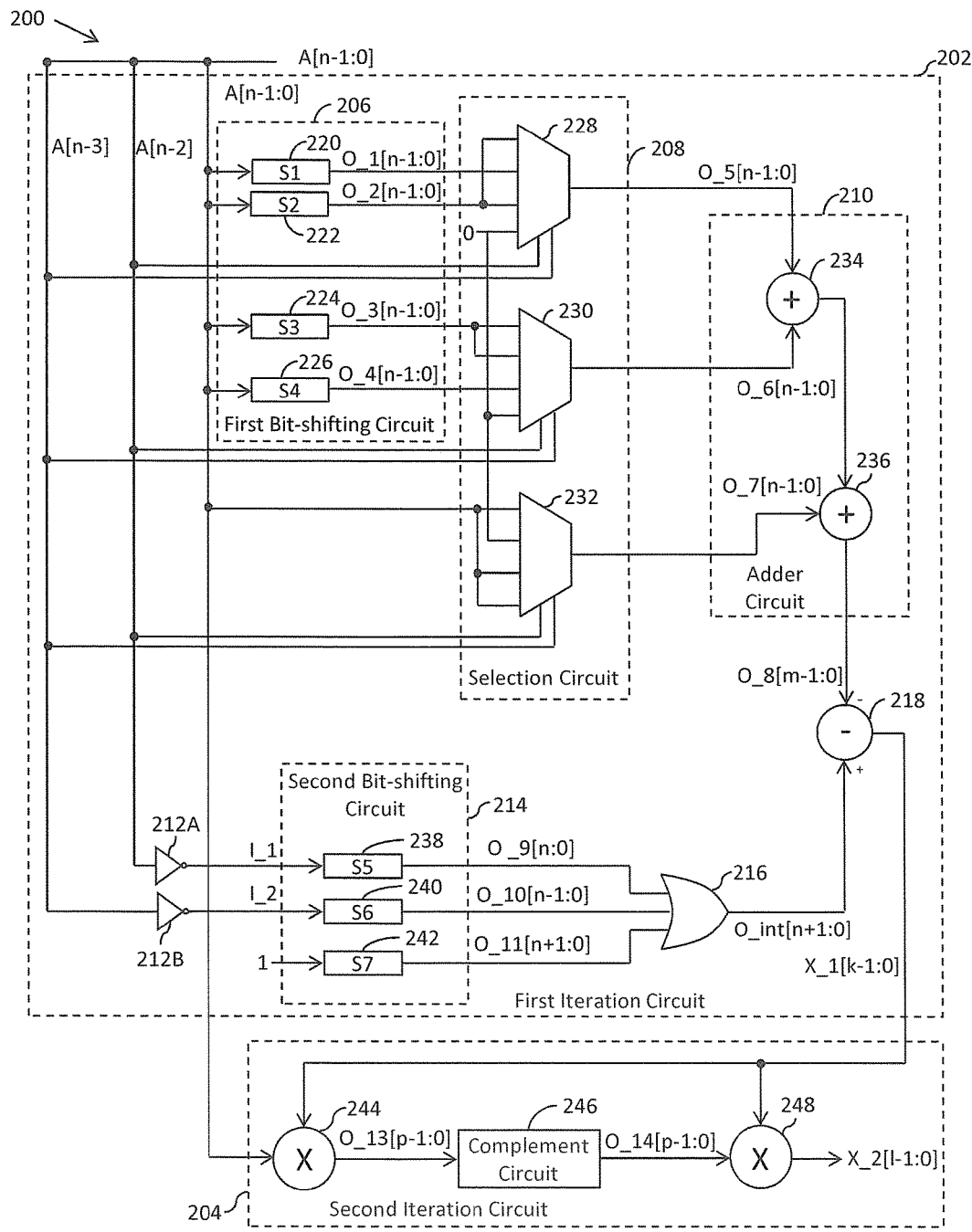
FIG. 2 is a schematic circuit diagram of a reciprocal approximation circuit in accordance with an embodiment of the present invention.

Referring now to FIG. 2, a schematic circuit diagram of a reciprocal approximation circuit 200 in accordance with an embodiment of the present invention is shown. The reciprocal approximation circuit 200 includes a first iteration circuit 202 and a second iteration circuit 204. The reciprocal approximation circuit 200 receives an operand 'A' for which the approximate reciprocal value is to be determined from an external circuit (not shown). The operand 'A' has a first set of input bits A[n−1:0], where 'n' is the number of bits of the operand 'A'.

The first iteration circuit 202 receives operand bits A[n−1:0] from the external circuit, and generates a first approximate reciprocal value of the operand A[n−1:0], when the operand A[n−1:0] is in the range of 0.5 to 1. The range 0.5 to 1 may be partitioned into first through fourth sub-ranges, such as 0.5 to 0.625, 0.625 to 0.75, 0.75 to 0.875, and 0.875 to 1.0. The first iteration circuit 202 includes a first bit-shifting circuit 206, a selection circuit 208, an adder 210, first and second inverters 212A and 212B, a second bit-shifting circuit 214, a first logic gate 216, and a subtractor 218.

The operation of the first iteration circuit 202 is controlled by the second and third most significant bits A[n−2] and A[n−3] of the operand A. The bits A[n−2] and A[n−3] indicate a sub-range in which the operand A lies, thereby enabling the first iteration circuit 202 to use an appropriate initial value for the first iteration of the Newton-Raphson method. For example, if the first through fourth sub-ranges correspond to first through fourth initial values, such as 1.75, 1.5, 1.25, and 1, then based on the sub-range in which the operand A lies, the first iteration circuit 202 will use the corresponding initial value. The first iteration circuit 202 is designed such that the first through fourth initial values are used internally based on the operand bits A[n−2] and A[n−3].

The first bit-shifting circuit 206 receives the operand A[n−1:0], and generates first through fourth operand multiples O_1[n−1:0]-O_4[n−1:0]. The first bit-shifting circuit 206 includes first through fourth bit-shifters 220-226.

The first bit-shifter 220 has an input terminal that receives the operand A[n−1:0] from the external circuit, and an output terminal that provides the first operand multiple O_1[n−1:0] by shifting the operand to the right by two bits.

The second bit-shifter 222 has an input terminal that receives the operand A[n−1:0] from the external circuit, and an output terminal that provides the second operand multiple O_2[n−1:0] by shifting the operand to the right by four bits.

The third bit-shifter 224 has an input terminal that receives the operand A[n−1:0] from the external circuit, and an output terminal that provides the third operand multiple O_3[n−1:0] by shifting the operand to the left by one bit.

The fourth bit-shifter 226 has an input terminal that receives the operand A[n−1:0] from the external circuit, and an output terminal that provides the fourth operand multiple O_4[n−1:0] by shifting the operand A[n−1:0] to the right by one bit.

The selection circuit 208 receives the operand A[n−1:0] and a first static bit '0' from the external circuit. The selection circuit 208 is connected to the first bit-shifting circuit 206 for receiving the first through fourth operand multiples O_1[n−1:0]-O_4[n−1:0]. The selection circuit 208 further receives first and second select bits A[n−2] and A[n−3] (hereinafter referred to as "select bits A[n−2] and A[n−3]") from the external circuit. It is noted that the select bits are a part of the operand A, and in particular, the select bits A[n−2] and A[n−3] are the second and third most significant bits, respectively, of the operand A[n−1:0]. The selection circuit 208 outputs at least one of the operand A[n−1:0], the first through fourth operand multiples O_1[n−1:0]-O_4[n−1:0], and the first static bit '0' as first through third selection outputs O_5[n−1:0]-O_7[n−1:0], based on the select bits A[n−2] and A[n−3]. The selection circuit 208 includes first through third multiplexers or muxes 228-232. In the presently preferred embodiment, the first through third muxes 228-232 are 4:1 multiplexers.

The first mux 228 has first and second inputs connected to the output of the second bit-shifter 222 for receiving the second operand multiple O_2[n−1:0] and a third input connected to the output of the first bit-shifter 220 for receiving the second operand multiple O_1[n−1:0]. The first mux 228 further has a fourth input that receives the first static bit '0'. The first mux 228 also has first and second select input terminals that receive the select bits A[n−2] and A[n−3], respectively. The first mux 228 outputs a selected one of the inputs, based on the value of the select bits. When the select bits are one of '00' and '10', the first mux 228 outputs the second operand multiple O_2[n−1:0] as the first selection output O_5[n−1:0]. When the select bits are '01', the first mux 228 outputs the first operand multiple O_1[n−1:0] as the first selection output O_5[n−1:0]. When the select bits are '11', the first mux 228 outputs the static bit '0' as the first selection output O_5[n−1:0].

The second mux 230 has first and second inputs connected to the output of the third bit-shifter 224 for receiving the third operand multiple O_3[n−1:0], a third input connected to the output of the fourth bit-shifter 226 for receiving the fourth operand multiple O_4[n−1:0], a fourth input that receives the first static bit '0', and first and second select terminals that receive the select bits A[n−2] and A[n−3], respectively. The second mux 230 outputs one of the third operand multiple O_3[n−1:0], the fourth operand multiple O_4[n−1:0], and the first static bit '0' as the second selection output O_6[n−1:0], based on the select bits A[n−2] and A[n−3]. When the select bits are one of '00' and '01', the second mux 230 outputs the third operand multiple O_3[n−1:0] as the second selection output O_6[n−1:0]. When the select bits are '10', the second mux 230 outputs the fourth operand multiple O_4[n−1:0] as the second selection output O_6[n−1:0]. When the select bits are '11', the second mux 230 outputs the static bit '0' as the second selection output O_6[n−1:0].

The third mux 232 has first through third inputs connected to the external circuit for receiving the operand A[n−1:0], and a fourth input for receiving the first static bit '0'. The third mux 232 also has first and second select terminals that receive the select bits A[n−2] and A[n−3], respectively. The third mux 232 outputs one of the operand A[n−1:0] and the first static bit '0' as the third selection output O_7[n−1:0], based on the select bits A[n−2] and A[n−3]. When the select bits are one of '00', '10', and '11', the third mux 232 outputs the first input bits A[n−1:0] as the third selection output O_7[n−1:0]. When the select bits are '01', the third mux 232 outputs the static bit '0' as the third selection output O_7[n−1:0].

The adder 210 is connected to the selection circuit 208 for receiving the first through third selection outputs O_5[n−1:0]-O_7[n−1:0]. The adder 210 generates a first sum [m−1:0] by adding the first through third selection outputs O_5[n−1:0]-O_7[n−1:0]. In one embodiment, the adder 210 includes first and second adder circuits 234 and 236. In another embodiment, the first and second adder circuits 234 and 236 may be replaced by a single adder circuit or any other digital circuit performing an equivalent operation of the first and second adder circuits 234 and 236.

The first adder circuit 234 has first and second inputs connected to the outputs of the first and second muxes 228 and 230 for receiving the first and second selection outputs O_5[n−1:0] and O_6[n−1:0], respectively. The first adder circuit 234 generates a first intermediate sum by adding the fifth and sixth selection outputs O_5[n−1:0] and O_6[n−1:0].

The second adder circuit 236 has first and second inputs connected to the third mux 232 and the first adder circuit 234 for receiving the third selection output O_7[n−1:0] and the first intermediate sum, respectively. The second adder circuit 236 generates the first sum O_8[m−1:0] by adding the third selection output O_7[n−1:0] and the first intermediate sum.

The first inverter 212A receives the first select bit A[n−2] from the external circuit, and outputs an inverted version of the first select bit I_1. The second inverter 212B receives the second select bit A[n−3] from the external circuit, and outputs an inverted version of the second select bit I_2.

The second bit-shifting circuit 214 is connected to the first and second inverters 212A and 212B for receiving the inverted versions of the first and second select bits I_1 and I_2. The second bit-shifting circuit 214 further receives a second static bit '1' from the external circuit. The second bit-shifting circuit 214 includes fifth through seventh bit-shifters 238-242 that generate fifth through seventh bit-shifter outputs O_9[n:0], O_10[n−1:0], and O_11[n+1:0].

The fifth bit-shifter 238 has an input connected to the output of the first inverter 212A for receiving the inverted version of the first select bit I_1, and an output that provides the fifth bit-shifter output O_9[n:0]. The fifth bit-shifter 238 is an n-bit left-shifter that shifts the inverted first select bit I_1 to left by n bits to generate the fifth bit-shifter output O_9[n:0].

The sixth bit-shifter 240 has an input connected to the output of the second inverter 212B for receiving the inverted version of the second select bit I_2, and an output that provides the sixth bit-shifter output O_10[n−1:0]. The sixth bit-shifter 240 is an (n−1)-bit left-shifter that shifts the inverted second select bit I_2 to the left by (n−1) bits to generate the sixth bit-shifter output O_10[n−1:0].

The seventh bit-shifter 242 has an input that receives the second static bit '1' from the external circuit, and an output that provides the seventh bit-shifter output O_11[n+1:0]. The seventh bit-shifter 242 left shifts the second static bit '1' by (n+1) bits to generate the seventh bit-shifter output O_11[n+1:0].

The first logic gate 216 receives the fifth through seventh bit-shifter outputs O_9[n:0]-O_11[n+1:0] and generates a set of intermediate bits O_int[n+1:0] (hereinafter referred to as "intermediate bits O_int[n+1:0]"). In the presently preferred embodiment, the first logic gate 216 is an OR gate. However, it will be apparent to a person skilled in the art that the first logic gate 216 can be replaced by an adder (not shown) or any other digital circuit that can perform an equivalent logical operation. Applicant also notes that it will be apparent to one of skill in the art that the static bits may be provided by an external circuit or they may comprise input terminals that are tied low or high depending on the desired value of the static bit.

The subtractor 218 has first and second inputs connected to the adder 210 and the first logic gate 216 for receiving the first sum O_8[m−1:0] and the intermediate bits O_int[n+1:0], respectively. The subtractor 218 subtracts the first sum O_8[m−1:0] from the intermediate bits O_int[n+1:0], and generates a difference X_1[k−1:0] thereof that represents the first approximate reciprocal value of the operand 'A'.

The second iteration circuit 204 receives the operand 'A' from the external circuit, and the first approximate reciprocal value from the first iteration circuit 202, and generates a second approximate reciprocal value of the operand 'A'. The second iteration circuit 204 includes a first multiplier 244, a complement circuit 246, and a second multiplier 248.

The first multiplier 244 has a first input connected to the output of the subtractor 218 for receiving the difference, and a second input that receives the operand 'A'. The first multiplier 244 generates a first product O_13[p−1:0] by multiplying the difference X_1[k−1:0] and the operand 'A'.

The complement circuit 246 is connected to the first multiplier 244 and receives the first product O_13[p−1:0], and generates a first complement O_14[p−1:0] of the first product O_13[p−1:0]. In one embodiment, the first complement is a 1's complement of the first product O_13[p−1:0]. In another embodiment, the first complement O_14[p−1:0] is a 2's complement of the first product O_13[p−1:0].

The second multiplier 248 is connected to the complement circuit 246 and the subtractor 218, and receives the first complement O_14[p−1:0] and the difference X_1[k−1:0], respectively. The second multiplier 248 generates a second product X_2[l−1:0] by multiplying the first complement O_14[p−1:0] and the difference X_1[k−1:0]. The second product is the second approximate reciprocal value of the operand 'A'. The accuracy of the second approximate reciprocal value is greater than that of the first approximate reciprocal value.

In operation, the first bit-shifting circuit 206 receives the operand 'A' having the first set of input bits [a7 a6 a5 a4 a3 a2 a1 a0] (here n=8) from the external circuit. In one embodiment, when the operand 'A' is less than 0.5, an m-bit left-shifter (not shown) is used to shift the operand 'A' to the left by 'm' bits to bring the operand 'A' within the range of 0.5 to 1. In another embodiment, when the operand 'A' is greater than 1, an m-bit right-shifter (not shown) is used to shift the operand 'A' to the right by 'm' bits to bring the operand 'A' within the range of 0.5 to 1.

The first through fourth bit-shifters 220-226 receive the operand [a7 a6 a5 a4 a3 a2 a1 a0]. The first bit-shifter 220 shifts the operand to the right by two bits to generate the first operand multiple [0 0 a7 a6 a5 a4 a3 a2]. The second bit-shifter 222 shifts the operand to the right by four bits to generate the second operand multiple [0 0 0 0 a7 a6 a5 a4 a3]. The third bit-shifter 224 shifts the operand to the left by one bit to generate the third operand multiple [a6 a5 a4 a3 a2 a1 a0 0]. The fourth bit-shifter 226 shifts the operand to the right by one bit to generate the fourth operand multiple [0 a7 a6 a5 a4 a3 a2 a1].

The first mux 228 receives the first operand multiple [0 0 a7 a6 a5 a4 a3 a2] and the second operand multiple [0 0 0 0 a7 a6 a5 a4 a3] from the first and second bit-shifters 220 and 222, respectively. The first mux 228 also receives the first static bit '0', and the select bits a6 and a5 from the external circuit. If, for example, the select bits are '01', then the first mux 228 will output the first operand multiple [0 0 a7 a6 a5 a4 a3 a2] as the first selection output [0 0 a7 a6 a5 a4 a3 a2].

The second mux 230 receives the third operand multiple [a6 a5 a4 a3 a2 a1 a0 0] and the fourth operand multiple [0 a7 a6 a5 a4 a3 a2 a1] from the third and fourth bit-shifters 224 and 226. The second multiplexer 230 also receives the first static bit '0', and the select bits a6 and a5 from the external circuit. If, for example, the select bits are '01', then the second mux 230 will output the third operand multiple [a6 a5 a4 a3 a2 a1 a0 0] as the second selection output [a6 a5 a4 a3 a2 a1 a0 0].

The third mux 232 receives the operand [a7 a6 a5 a4 a3 a2 a1 a0], the first static bit '0', and the select bits a6 and a5 from the external circuit. If, for example, the select bits are '01', then the third mux 232 will output the first static bit '0' as the third selection output [0].

The first adder circuit 234 receives the first selection output [0 0 a7 a6 a5 a4 a3 a2] and the second selection output [a6 a5 a4 a3 a2 a1 a0 0] from the first and second muxes 228 and 230, respectively. The first adder circuit 234 adds the first selection output [0 0 a7 a6 a5 a4 a3 a2] and the second selection output [a6 a5 a4 a3 a2 a1 a0 0] to generate the first intermediate sum [c7 c6 c5 c4 c3 c2 c1 c0].

The second adder circuit 236 receives the third selection output [0] from the third mux 232 and the first intermediate sum [c7 c6 c5 c4 c3 c2 c1 c0] from the first adder circuit 234, and adds the third selection output [0] and the first intermediate sum [c7 c6 c5 c4 c3 c2 c1 c0] to generate the first sum [c7 c6 c5 c4 c3 c2 c1 c0].

The first and second inverters 212A and 212B receive and invert the select bits a6 and a5 to generate the inverted versions of the first and second select bits I_1 and I_2, respectively (or /a6 and /a5). For example, if the select bits are '01', then the inverted versions of the select bits are '10'.

The fifth bit-shifter 238 receives the inverted version of the first select bit '1' from the first inverter 212A, and shifts the inverted version of the first select bit '1' to left by '8' bits to generate the fifth bit-shifter output [1 0 0 0 0 0 0 0 0]. The sixth bit-shifter 240 receives the inverted version of the second select bit '0' from the second inverter 212B, and shifts the inverted version of the second select bit '0' to left by '7' bits (i.e., (n−1) bits) to generate the sixth bit-shifter output [0 0 0 0 0 0 0 0]. The seventh bit-shifter 242 receives the second static bit '1' from the external circuit and shifts the second static bit '1' to left by '9' bits (i.e., (n+1) bits) to generate the seventh bit-shifter output [1 0 0 0 0 0 0 0 0].

The first logic gate 216 receives the fifth through seventh bit-shifter outputs [1 0 0 0 0 0 0 0 0], [0 0 0 0 0 0 0 0], and [1 0 0 0 0 0 0 0 0] from the fifth through seventh bit-shifters 238-242, respectively, and performs a bit-wise OR operation to generate the intermediate bits [1 1 0 0 0 0 0 0 0].

The subtractor 218 receives the first sum [c7 c6 c5 c4 c3 c2 c1 c0] and the intermediate bits [1 1 0 0 0 0 0 0 0] from the second adder 236 and the first logic gate 216, respectively. The subtractor 218 subtracts the first sum [c7 c6 c5 c4 c3 c2 c1 c0] from the intermediate bits [1 1 0 0 0 0 0 0 0] to generate the difference [d7 d6 d5 d4 d3 d2 d1 d0], which represents the first approximate reciprocal value of the operand 'A'.

The first multiplier 244 receives the difference [d7 d6 d5 d4 d3 d2 d1 d0] from the subtractor 218 and the operand [a7 a6 a5 a4 a3 a2 a1 a0] from the external circuit, and multiplies the difference [d7 d6 d5 d4 d3 d2 d1 d0] with the operand [a7 a6 a5 a4 a3 a2 a1 a0] to generate the first product [e7 e6 e5 e4 e3 e2 e1 e0].

The complement circuit 246 receives and complements the first product [e7 e6 e5 e4 e3 e2 e1 e0] to generate the first complement [e7' e6' e5' e4' e3' e2' e1 e0']. The second multiplier 248 receives the first complement [e7' e6' e5' e4' e3' e2' e1 e0'] from the complement circuit 246 and the difference [d7 d6 d5 d4 d3 d2 d1 d0] from the subtractor 218. The second multiplier 248 multiplies the first complement [e7' e6' e5' e4' e3' e2' e1' e0'] with the difference [d7 d6 d5 d4 d3 d2 d1 d0] to generate the second product [f7 f6 f5 f4 f3 f2 f1 f0], which represents the second approximate reciprocal value of the operand 'A'.

It will be apparent to a person having ordinary skill in the art that the reciprocal approximation circuit 200 may further include multiple iteration circuits (not shown) that are structurally and functionally similar to the second iteration circuit 204 for performing successive iterations of the Newton-Raphson method without departing from the scope and spirit of the present invention. The multiple iteration circuits may be cascaded with the second iteration circuit 204 for greater accuracy.

The conventional reciprocal approximation circuit 100 determines the initial value X_0 for the iteration circuit 104 based on the range in which the operand lies. However, the first iteration circuit 202 uses the second and third most significant bits A[n−2] and A[n−3] as select bits for the first through third mux 228-232, where the second and third most significant bits A[n−2] and A[n−3] indicate a sub-range, such as 0.5 to 0.625, 0.625 to 0.75, 0.75 to 0.875, and 0.875 to 1.0, in which the operand 'A' lies. Therefore, the first iteration circuit 202 does not require an additional step for the selection of the initial value X_0 for its operation. Hence, the reciprocal approximation circuit 200 eliminates the need of an additional initial value selection circuit for selecting the initial value, while maintaining accuracy. Further additional multipliers and complement circuits are not required for the implementation of the first iteration circuit 202. Therefore, the reciprocal approximation circuit 200 consumes less area on an integrated circuit than the conventional solution.

Figure 3:
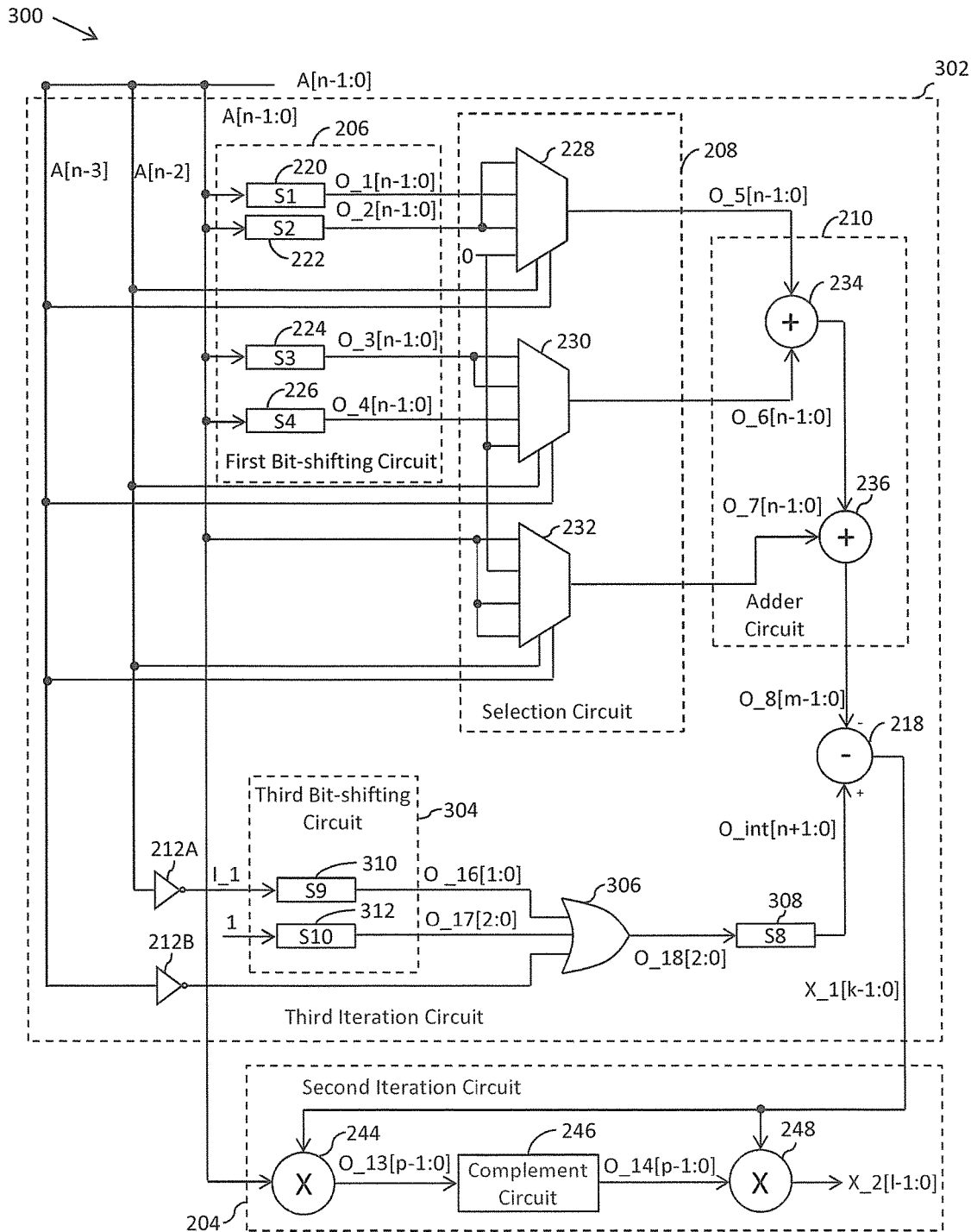
FIG. 3 is a schematic circuit diagram of a reciprocal approximation circuit in accordance with another embodiment of the present invention.

Referring now to FIG. 3, a schematic circuit diagram of a reciprocal approximation circuit 300 in accordance with another embodiment of the present invention is shown. The reciprocal approximation circuit 300 includes a third iteration circuit 302 and the second iteration circuit 204. The third iteration circuit 302 is similar to the first iteration circuit 202, and includes the first bit-shifting circuit 206, the selection circuit 208, the adder 210, the first and second inverters 212A and 212B, and the subtractor 218. The third iteration circuit 302 differs from the first iteration circuit 202 in that the second bit-shifting circuit 214 and the OR gate 216 have been replaced with a third bit-shifting circuit 304, a second logic gate 306, and an eighth bit-shifter 308. The third iteration circuit 302 receives the operand 'A' from the external circuit, and generates the first approximate reciprocal value of the operand 'A'.

The third bit-shifting circuit 304 is connected to the first inverter 212A and the external circuit for receiving the inverted version of the first select bit I_1 and the second static bit '1', respectively. In an alternative embodiment, instead of being connected to the external circuit to receive the third static bit, the input receiving the static bit could be tied high. The third bit-shifting circuit 304 includes ninth and tenth bit-shifters 310 and 312.

The ninth bit-shifter 310 is connected to the output of the first inverter 212A for receiving the inverted version of the first select bit I_1. The ninth bit-shifter 310 generates a fourth bit-shifter output O_16[1:0]. The ninth bit-shifter 310 is a 1-bit left-shifter that shifts the inverted version of the first select bit I_1 to the left by one bit to generate the fourth bit-shifter output O_16[1:0] O_16[1:0].

The tenth bit-shifter 312 receives the second static bit '1', and generates a fifth bit-shifter output O_17[2:0]. The tenth bit-shifter 312 is a 2-bit left-shifter that shifts the second static bit '1' to the left by two bits to generate the fifth bit-shifter output O_17[2:0].

The second logic gate 306 has an input connected to the output of the first inverter 212A for receiving the inverted version of the second select bit I_2. The second logic gate 306 has second and third inputs connected to the outputs of the ninth and tenth bit-shifters 310 and 312 for receiving the fourth and fifth bit-shifter outputs O_16[2:0] and O_17[2:0], respectively. The second logic gate 306 generates a logic gate output signal O_18[2:0]. In one embodiment, the second logic gate 306 is an OR gate. However, it will be apparent to a person skilled in the art that the second logic gate 306 could comprises an adder or any other digital circuit that can perform an equivalent operation.

The eighth bit-shifter 308 receives the logic gate output signal O_18[2:0], and generates the intermediate bits O_int[n+1:0]. The eighth bit-shifter 308 includes an (n−1)-bit left-shifter that shifts the logic gate output signal O_18[2:0] to the left by (n−1) bits to generate the intermediate bits O_int[n+1:0].

Figure 4A:
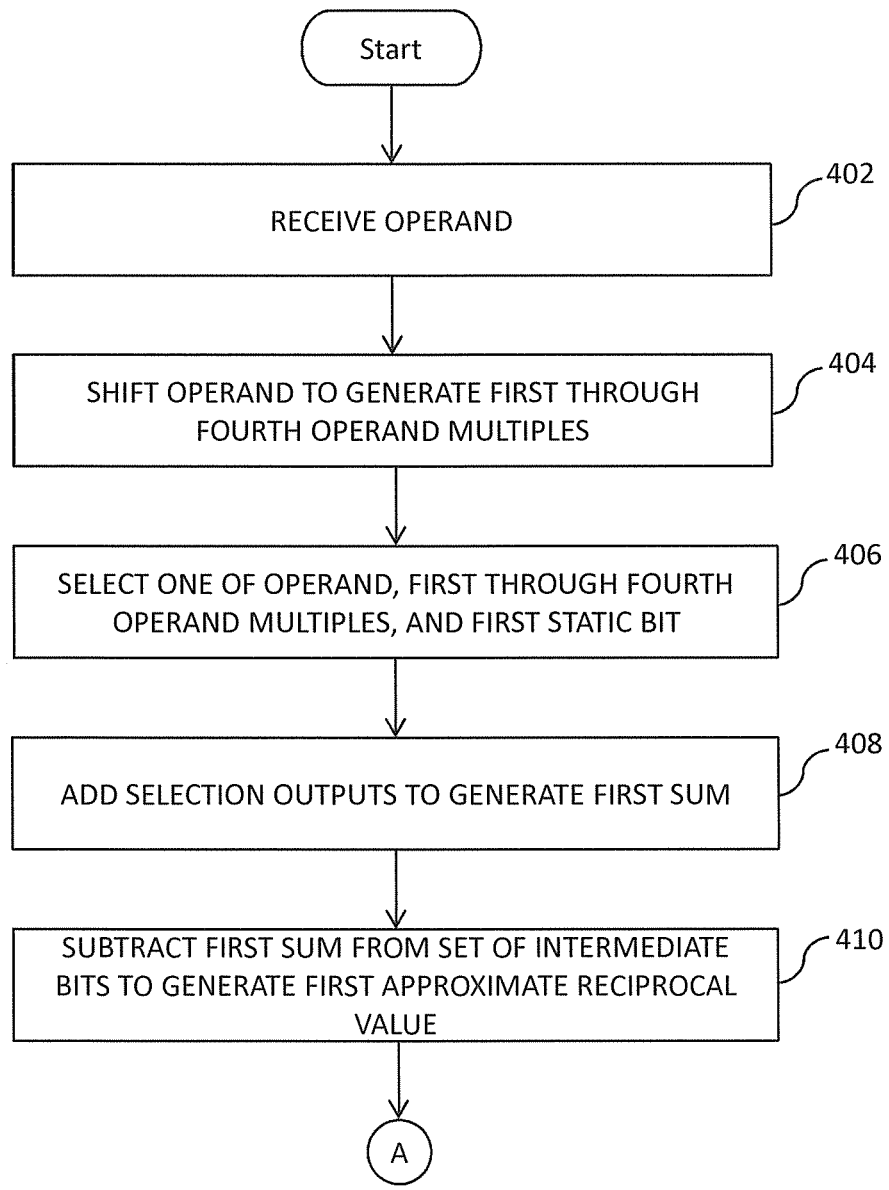
FIGS. 4A and 4B are a flow chart of a method for determining an approximate reciprocal value of an operand in accordance with an embodiment of the present invention.
Figure 4B:
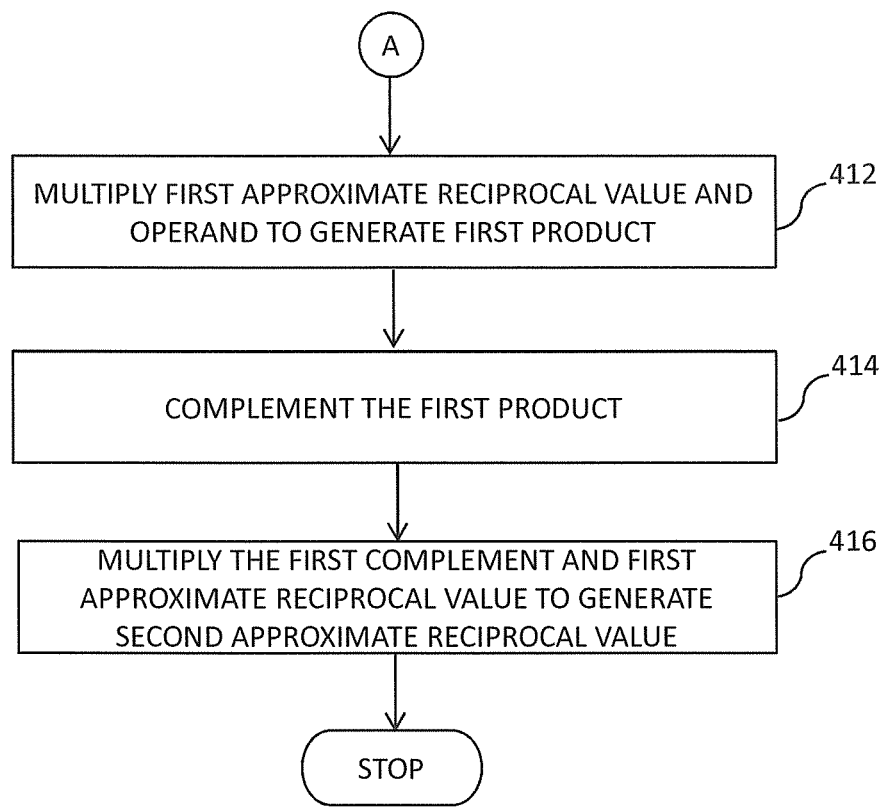

Referring now to FIGS. 4A and 4B, collectively, a flow chart of a method for determining an approximate reciprocal value of an operand in accordance with an embodiment of the present invention is shown. The reciprocal approximation circuits 200 and 300 may implement the method for determining the approximate reciprocal value of the operand.

At step 402, the reciprocal approximation circuit 200 receives the operand 'A'. At step 404, the first bit-shifting circuit 206 shifts the operand 'A' to generate the first through fourth operand multiples O_1[n−1:0]-O_4[n−1:0].

At step 406, the selection circuit 208 selects one of the operand 'A', the first through fourth operand multiples, and the first static bit '0' as the first through third selection outputs_5[n−1:0]-O_7[n−1:0], based on the select bits A[n−2] and A[n−3]. At step 408, the adder 210 adds the first through third selection outputs O_5[n−1:0]-O_7[n−1:0] to generate the first sum.

At step 410, the subtractor 218 subtracts the first sum from the intermediate bits O_int[n+1:0] to generate the first approximate reciprocal value of the operand 'A' as the difference. At step 412, the first multiplier 244 multiplies the first approximate reciprocal value with the operand 'A' to generate the first product.

At step 414, the complement circuit 246 complements the first product to generate the first complement. At step 416, the second multiplier 248 multiplies the first complement with the first approximate reciprocal value to generate the second approximate reciprocal value of the operand 'A' as the second product.

Figure 5:
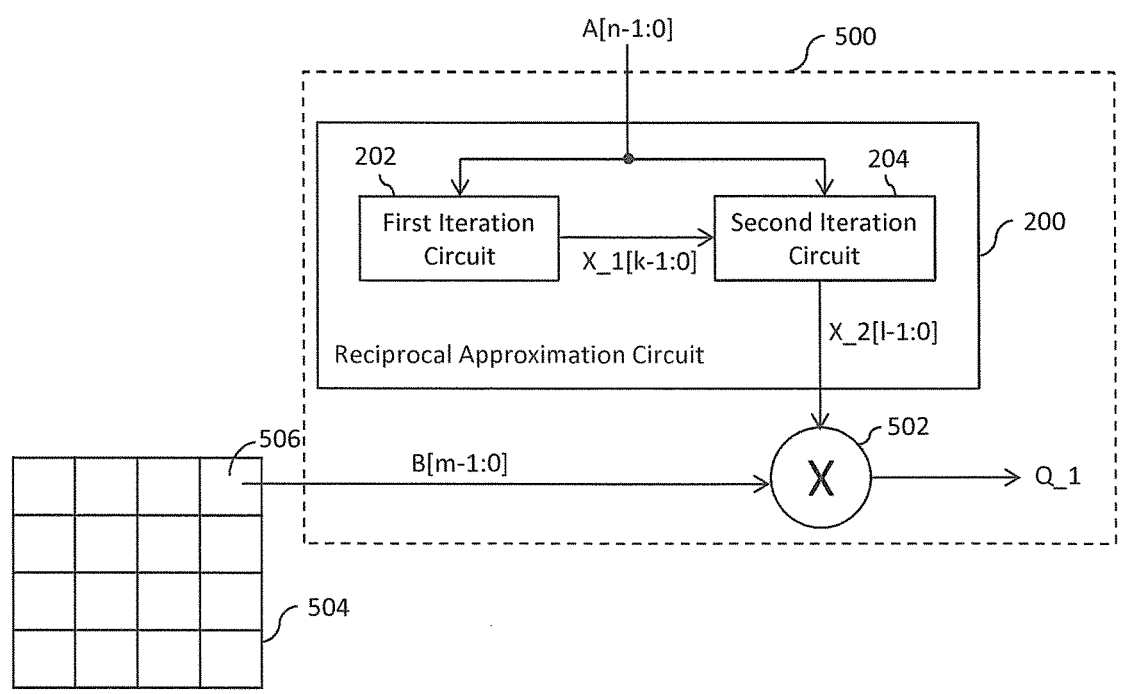
FIG. 5 is a schematic block diagram of a division circuit in accordance with an embodiment of the present invention.

Referring now to FIG. 5, a schematic block diagram of a division circuit 500 in accordance with an embodiment of the present invention is shown. In one embodiment, the division circuit 500 is part of an image processing circuit. The division circuit 500 includes the reciprocal approximation circuit 200, and a third multiplier 502 for transforming a first digital image 504 from a first color domain to a second color domain. Example color domain include RGB, XYZ, CMYK, LUV, normalized RGB, and the like. It will be apparent to a person skilled in the art that the division circuit

500 also can be implemented using the reciprocal approximation circuit 300 without deviating from the scope of the invention.

The first digital image 504 includes a set of pixels. For example, the first digital image 504 may be an NxN digital image (where N is 4) having NxN pixels (for example 16). Each pixel of the first digital image 504 is represented as a vector having a set of vector fields. Each vector field of a pixel of the first digital image 504 represents a value of a color component. For example, if the first digital image 504 is in the RGB color domain, each pixel, such as a first pixel 506, of the first digital image 504, is represented as a vector having three vector fields (such as red, green, and blue vector fields). Further, a red vector field of the first pixel 506 represents a value of the red color component for the first pixel 506. Similarly, the green and blue vector fields of the first pixel 506 represent values of the green and blue color components for the first pixel 506.

The division circuit 500 receives a dividend B[m−1:0] from the external circuit and a divisor, for example the operand A[n−1:0], where A and B are computed from the same input vector field. For example, in one embodiment, the external circuit is an image acquisition device (not shown).

The dividend B[m−1:0] represents the value of the color component of one of the first through third vector fields of the first pixel 506. In one embodiment, A and B both are derived from same input using two different mathematical operations such as A=c0*X, and B=c1*X+c2*Y+C3*Z. In another embodiment, the dividend B[m−1:0] represents the value of the color component of the first vector field, and the divisor 'A' is a function of the value of color component for the first through third vector fields of the first pixel 506. For example, the divisor 'A' for the first pixel 506 may be represented by equation (4):

$$A=K1*X+K2*Y+K3*Z \qquad (4)$$

where,
A is the divisor A[n−1:0];
K1, K2, and K3 are real numbers;
X is the value of color component for the first vector field;
Y is the value of color component for the second vector field; and
Z is the value of color component for the third vector field.

The reciprocal approximation circuit 200 receives the divisor A[n−1:0], and generates the first and second approximate reciprocal values of the divisor A[n−1:0] as described with reference to FIGS. 2 and 3.

The third multiplier 502 is connected to the reciprocal approximation circuit 200 for receiving the second approximate reciprocal value of the divisor A[n−1:0]. In another embodiment, the third multiplier 502 may receive the first approximate reciprocal value from the reciprocal approximation circuit 200. The third multiplier 502 also receives the dividend B[m−1:0]. The third multiplier 502 multiplies one of the first and second approximate reciprocal values of the divisor A[n−1:0] with the dividend B[m−1:0] to generate a first quotient Q_1. The first quotient Q_1 represents a value of a fourth vector field of the first pixel 506 in the second color domain. The division circuit 500 may then transform each vector field of each pixel of the first digital image 504 from the first color domain to the second color domain using a corresponding divisor, and thereby transforming the first digital image 504 to the second color domain.

The reciprocal approximation circuit 200 does not require the initial selection circuit 102 used in the conventional reciprocal approximation circuit 100 and eliminates a need for using two of the multipliers required by the first iteration circuit 202. Thus, the reciprocal approximation circuit 200 requires less silicon area than the conventional reciprocal approximation circuit 100.

It will be understood by those skilled in the art that the same logical function may be performed by different arrangements of logic gates, multiplexers, bit-shifters or that logic circuits operate using either positive or negative logic signals. Therefore, variations in the arrangement of some of the logic gates, multiplexers, bit-shifters described above should not be considered to depart from the scope of the present invention.

While various embodiments of the present invention have been illustrated and described, it will be clear that the present invention is not limited to these embodiments only. Numerous modifications, changes, variations, substitutions, and equivalents will be apparent to those skilled in the art, without departing from the spirit and scope of the present invention, as described in the claims.

The invention claimed is:

1. A reciprocal approximation circuit for determining an approximate reciprocal value of an operand, the reciprocal approximation circuit comprising:
    a first bit-shifting circuit that receives the operand and generates first through fourth operand multiples;
    a selection circuit, connected to the first bit-shifting circuit, for receiving the first through fourth operand multiples, and also receiving the operand and a first static bit, and outputting first through third selection outputs by selecting at least one of the operand, the first through fourth operand multiples, and the first static bit, based on first and second select bits;
    an adder circuit, connected to the selection circuit, for receiving and adding the first through third selection outputs to generate a first sum; and
    a subtractor circuit, connected to the adder circuit, for receiving the first sum and determining a difference between the first sum and a set of intermediate bits, wherein the difference represents a first approximate reciprocal value of the operand.

2. The reciprocal approximation circuit of claim 1, wherein the first bit-shifting circuit comprises first through fourth bit-shifters that receive the operand and generate the first through fourth operand multiples, respectively.

3. The reciprocal approximation circuit of claim 2, wherein:
    the first bit-shifter shifts the operand right by two bits to generate the first operand multiple;
    the second bit-shifter shifts the operand right by four bits to generate the second operand multiple;
    the third bit-shifter shifts the operand left by one bit to generate the third operand multiple; and
    the fourth bit-shifter shifts the operand right by one bit to generate the fourth operand multiple.

4. The reciprocal approximation circuit of claim 2, wherein the selection circuit comprises:
    a first multiplexer that receives the first and second operand multiples from the first and second bit-shifters, respectively, and also receives the first static bit, and outputs one of the first operand multiple, the second operand multiple, and the first static bit as the first selection output, based on the first and second select bits;
    a second multiplexer that receives the third and fourth operand multiples from the third and fourth bit-shifters, respectively, and also receives the first static bit, and outputs one of the third operand multiple, the fourth operand multiple, and the first static bit as the second selection output, based on the first and second select bits; and a third multiplexer that receives the operand and the first static bit, and outputs one of the operand and the first static bit as the third selection output, based on the first and second select bits, and wherein the adder circuit comprises:
a first adder that receives the first and second selection outputs, and generates a first intermediate sum; and
a second adder that receives the first intermediate sum and the third selection output, and generates the first sum.

5. The reciprocal approximation circuit of claim 2, further comprising:
a second bit-shifting circuit that generates the set of intermediate bits provided to the subtractor circuit, wherein the second bit-shifting circuit comprises:
a fifth bit-shifter that receives an inverted version of the first select bit, and generates a fifth bit-shifter output;
a sixth bit-shifter that receives an inverted version of the second select bit, and generates a sixth bit-shifter output; and
a seventh bit-shifter that receives a second static bit, and generates a seventh bit-shifter output; and
a logic gate connected to the second bit-shifting circuit for receiving the fifth through seventh bit-shifter outputs, and generating the set of intermediate bits provided to the subtractor circuit.

6. The reciprocal approximation circuit of claim 2, further comprising:
a second bit-shifting circuit, wherein the second bit-shifting circuit comprises:
a fifth bit-shifter that receives an inverted version of the first select bit, and generates a fifth bit-shifter output; and
a sixth bit-shifter that receives a second static bit, and generates a sixth bit-shifter output;
a logic gate that receives the fith and sixth bit-shifter outputs, and an inverted version of the second select bit, and generates a logic gate output signal; and
a seventh bit-shifter connected to the logic gate for receiving the logic gate output signal, and generating the set of intermediate bits provided to the subtractor circuit.

7. The reciprocal approximation circuit of claim 1, further comprising:
a first multiplier that receives the difference generated by the subtractor circuit and the operand, and generates a first product thereof;
a complement circuit connected to the first multiplier for receiving the first product, and generating a first complement thereof; and
a second multiplier connected to the subtractor circuit and the complement circuit for receiving the difference and the first complement, respectively, and generating a second approximate reciprocal value of the operand.

8. The reciprocal approximation circuit of claim 1, wherein the first and second select bits comprise two bits of the operand.

9. The reciprocal approximation circuit of claim 1, wherein the first reciprocal approximation value is used to transform a first pixel of a digital image from a first color domain to a second color domain.

10. A method for determining an approximate reciprocal value of an operand, the method comprising:

shifting, by a first bit-shifting circuit, the operand to generate first through fourth operand multiples;

selecting, by a selection circuit, at least one of the operand, the first through fourth operand multiples, and a first static bit as first through third selection outputs, based on first and second select bits;

adding, by an adder circuit, the first through third selection outputs to generate a first sum; and subtracting, by a subtractor circuit, the first sum from a set of intermediate bits to generate a first difference, wherein the first difference represents a first approximate reciprocal value of the operand.

11. The method of claim 10, further comprising:
shifting, with a second bit-shifting circuit, an inverted version of the first select bit, an inverted version of the second select bit, and a second static bit to generate first through third bit-shifter outputs, respectively; and
generating, with a logic gate, the set of intermediate bits, based on the first through third bit-shifter outputs.

12. The method of claim 10, further comprising:
shifting, with a second bit-shifting circuit, an inverted version of the first select bit and a second static bit to generate first and second bit-shifter outputs, respectively;
generating, with a logic gate, a logic gate output signal based on the first and second bit-shifter outputs, and an inverted version of the second select bit; and
shifting, with a third bit-shifting circuit, the logic gate output signal to generate the set of intermediate bits.

13. The method of claim 10, further comprising:
multiplying, with a first multiplier, the difference and the operand to generate a first product;
complementing, with a complement circuit, the first product to generate a first complement; and
multiplying, with a second multiplier, the difference and the first complement to generate a second product, wherein the second product represents a second approximate reciprocal value of the operand.

14. The method of claim 10, wherein the first and second select bits comprise two bits of the operand.

15. A division circuit for determining a quotient, the division circuit comprising:
a reciprocal approximation circuit for determining at least a first approximate reciprocal value of an operand, wherein the reciprocal approximation circuit comprises:
a first bit-shifting circuit that receives the operand and generates first through fourth operand multiples;
a selection circuit, connected to the first bit-shifting circuit, that receives the first through fourth operand multiples, and also receives the operand and a first static bit, and outputs first through third selection outputs by selecting at least one of the operand, the first through fourth operand multiples, and the first static bit, based on first and second select bits;
an adder circuit, connected to the selection circuit, for receiving and adding the first through third selection outputs to generate a first sum; and
a subtractor circuit, connected to the adder circuit, for receiving the first sum and determining a difference between the first sum and a set of intermediate bits, wherein the difference represents a first approximate reciprocal value of the operand; and
a first multiplier, connected to the reciprocal approximation circuit, for receiving one of the first approximate reciprocal value and a second approximate reciprocal value of the operand, and also receives a dividend, and generates the quotient, based on a first product of the dividend and one of the first and second approximate reciprocal values.

16. The division circuit of claim 15, wherein the first bit-shifting circuit comprises first through fourth bit-shifters, wherein:
   the first bit-shifter receives and shifts the operand right two bits to generate the first operand multiple;
   the second bit-shifter receives and shifts the operand right four bits to generate the second operand multiple;
   the third bit-shifter receives and shifts the operand left one bit to generate the third operand multiple; and
   the fourth bit-shifter receives and shifts the operand right one bit to generate the fourth operand multiple.

17. The division circuit of claim 16, wherein the selection circuit comprises:
   a first multiplexer that receives the first and second operand multiples from the first and second bit-shifters, respectively, and also receives the first static bit, and outputs one of the first operand multiple, the second operand multiple, and the first static bit as the first selection output, based on the first and second select bits;
   a second multiplexer that receives the third and fourth operand multiples from the third and fourth bit-shifters, respectively, and also receives the first static bit, and outputs one of the third operand multiple, the fourth operand multiple, and the first static bit as the second selection output, based on the first and second select bits; and
   a third multiplexer that receives the operand and the first static bit, and outputs one of the operand and the first static bit as the third selection output, based on the first and second select bits, and
   wherein the adder circuit comprises:
      a first adder that receives the first and second selection outputs, and generates a first intermediate sum; and
      a second adder that receives the first intermediate sum and the third selection output, and generates the first sum.

18. The division circuit of claim 15, wherein the reciprocal approximation circuit further comprises:
   a second multiplier, connected to the subtractor circuit, for receiving the difference, and also receiving the operand, and generating a second product;
   a complement circuit, connected to the second multiplier, for receiving the second product, and generating a first complement thereof; and
   a third multiplier connected to the subtractor circuit and the complement circuit for receiving the difference and the first complement, respectively, and generating a third product that represents the second approximate reciprocal value.

19. The division circuit of claim 15, wherein the first and second select bits comprise two bits of the operand.

20. The division circuit of claim 15, wherein the first reciprocal approximation value is used to transform a first pixel of a digital image from a first color domain to a second color domain.

* * * * *